March 2, 1965  H. B. CARR  3,171,442
SWING GATE GOGGLE VALVE
Filed April 27, 1962  2 Sheets-Sheet 1

INVENTOR.
HUGH B. CARR
BY
*Christy, Parmelee & Strickland.*
his ATTORNEYS

March 2, 1965
H. B. CARR
3,171,442
SWING GATE GOGGLE VALVE
Filed April 27, 1962
2 Sheets-Sheet 2
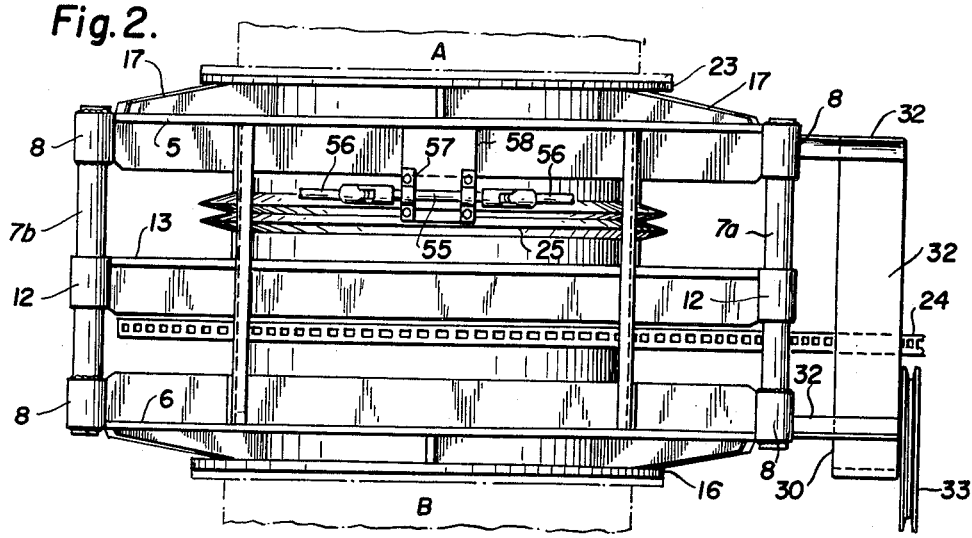
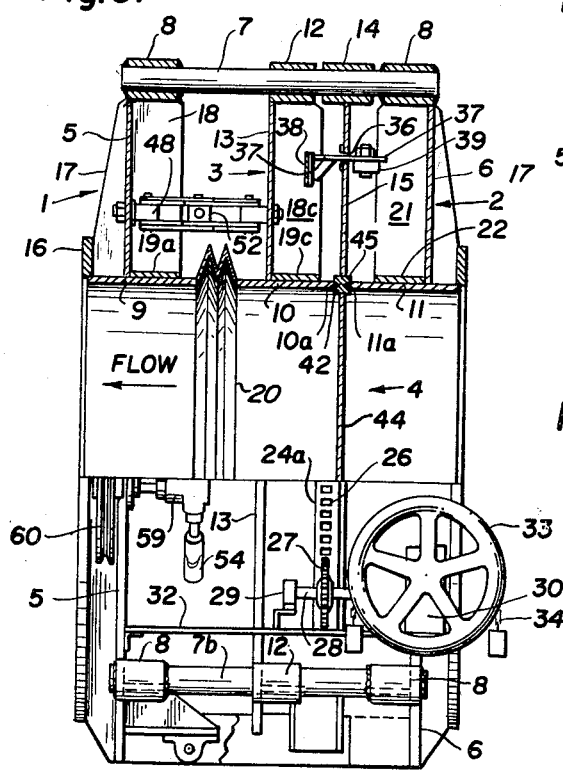
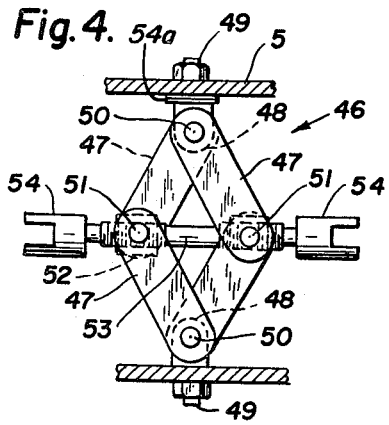
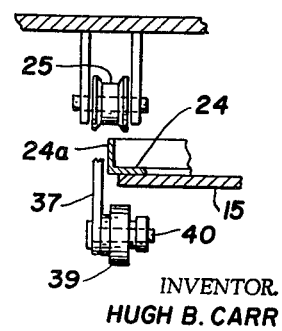
INVENTOR.
HUGH B. CARR
his ATTORNEYS.

3,171,442
SWING GATE GOGGLE VALVE
Hugh B. Carr, Carnegie, Pa., assignor to S. P. Kinney Engineers, Inc., Carnegie, Pa., a corporation of Pennsylvania
Filed Apr. 27, 1962, Ser. No. 190,537
3 Claims. (Cl. 138—94.5)

The present invention relates to a new and improved valve construction, more particularly to goggle valves such as used to control flow of gases and air through mains and the like.

The present goggle valve is particularly suited for shutting off flow of furnace gases in a horizontal gas main located in a congested area where installation of a vertical plate type goggle valve is impossible. The swing plate type goggle valve of the invention is especially suited for such situations, but is not limited thereto.

An object of the invention is to provide such a swing plate type goggle valve, that when in the closed position the gas main from each side of the goggle plate assures an absolute separation to prevent leakage of gas from one side of the valve to the other.

Another object of the invention is to provide for venting to the atmosphere gas leaking between the valve plate and the seating member.

A further object of the invention is to provide a novel form of clamping mechanism securing the valve in gas cut off position when closed.

These and other objects of the invention will be made apparent from the following description and the drawing forming a part thereof, wherein:

FIG. 2 shows a plan view of the valve as viewed from the bottom thereof;

FIG. 3 shows an end elevation of the valve, partly in vertical section with the valve plate in clamped gas main closing position;

FIG. 4 shows details of the frame clamping jacks taken at lines IV—IV of FIG. 3; and FIG. 5 shows the goggle plate positioning rollers at lines V—V of FIG. 1.

Figure 1:
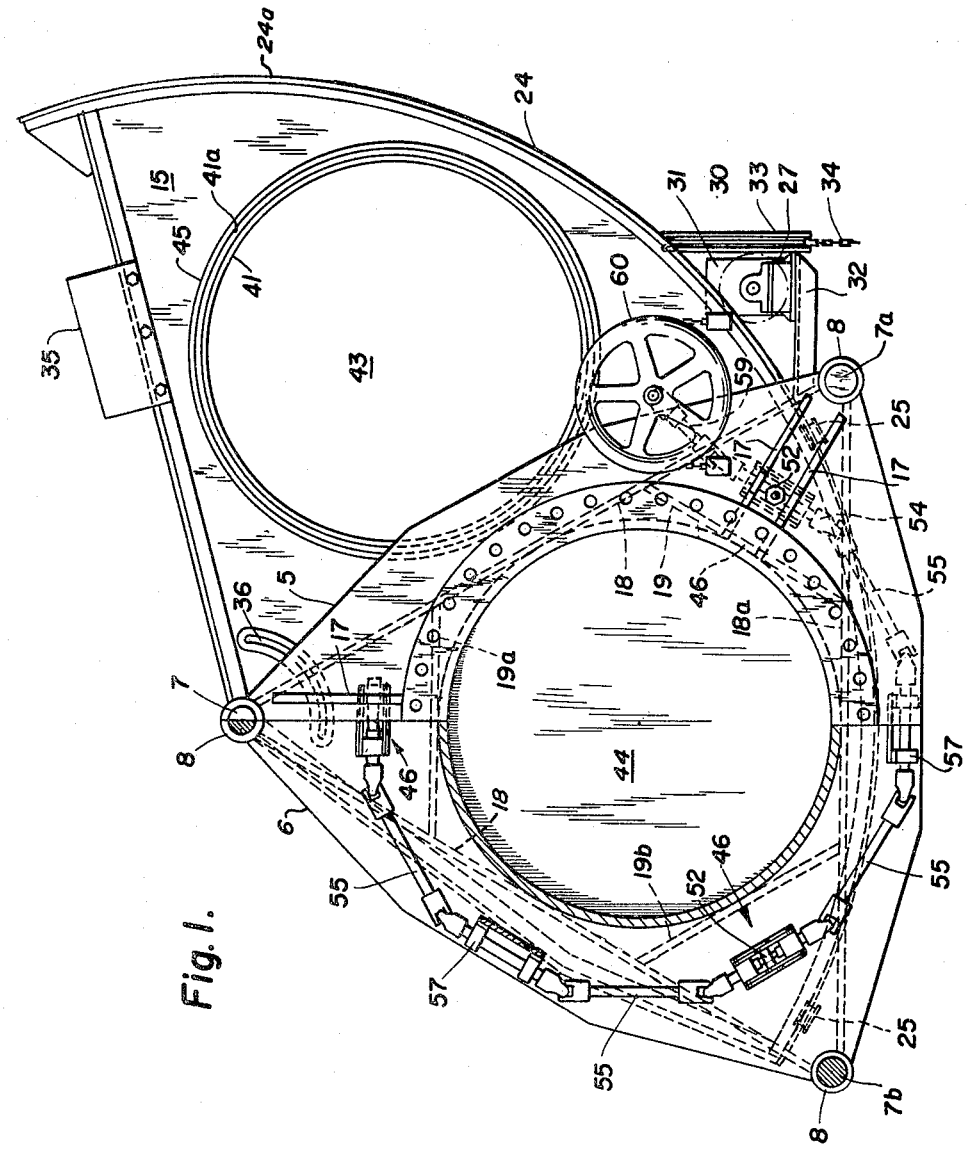
FIG. 1 shows the valve in elevation and partly in section, with the valve plate in gas main open position.

The valve assembly consists of an end frame 1, stationary frame 2, movable clamp frame 3 and movable goggle plate 4, as best illustrtaed in FIGS. 1 and 3.

Referring now in detail to the drawing, the front and rear faces of the valve body are comprised of substantially triangular outer plates 5 and 6 connected at the corners thereof by round rods 7, 7a and 7b. Each of the plates 5 and 6 at the corners thereof are preferably provided with sleeves 8 through which the rods 7 extend and are welded to the sleeves 8 to provide a rigid body. Plates 5 and 6 have apertures therein through which extend a cylindrical member comprised of spaced sleeves 9, 10 and 11. These sleeves, as hereinafter discussed, are secured in position to register with the internal diameter of sections A and B of the gas main within which the valve body is mounted.

Between the sleeves 8 and slidably mounted on rods 7, 7a and 7b are sleeves 12 to which is secured a third valve body plate 13 substantially similar to plates 5 and 6. Rotatably mounted upon rod 7 only, between sleeves 12 and 8 of plate 6 is a sleeve 14 to which is secured the goggle plate 15. Referring now to FIG. 3, it will be seen that sleeves 9 and 11 at one end extend outwardly of valve body plates 5 and are suitably welded to circular flange members 16 of a size and positioned to mate with a corresponding flange of an adjacent gas main. Such flange 16 has a central aperture therein receiving the sleeve 9. The gas main flange and flange member 16 have matching bolt holes therein to receive bolts securing the flanges together. Suitable braces 17, disposed between the outer face of plate 5 and flange 16, brace sleeve 9 adjacent the rods 7, 7a and 7b. Extending transversely of sleeve 9 from plate 5 and inwardly to adjacent the inner end of sleeve 9 is a triangular shaped brace comprised of members 18 and 18a whose opposite ends are connected to sleeves 8. Adjacent said latter sleeves the members 18 and 18a are connected by members 19, 19a and 19b which are tangent to and secured to sleeve 9. In this manner members 5, 18, 18a, 19, 19a and 19b provide a fixed end frame.

Similarly, valve body plate 13, sleeves 12 and members 18c and 18d with corresponding members 19 and 19a, 19b are secured to sleeve 10 to provide the clamping frame 3 slidably mounted upon rods 7, 7a and 7b. The adjacent spaced ends of sleeve sections 9 and 10 are connected by a metal expansion joint 20.

Similarly at the rear of the valve body, in combination with valve body plate 6, secured to adjacent sleeves 8, is a triangular frame comprised of corresponding members 21 and 21a extending between posts 7, 7a and 7b and secured thereto and plate 6. Said members 21 and 21a are connected by members 22, 22a and 22b. Said latter members are disposed tangent to sleeve 11 and secured thereto. As shown in FIG. 3, sleeve 11 has its inner end portion 11a disposed at all times in spaced relation to the adjacent end portion 10a of sleeve 10. These adjacent sleeves 11a and 10a are pointed for a purpose to be hereinafter discussed. The outer end of sleeve 11 is enclosed by end plate 6 and receives a circular flange ring 23 having a central aperture therein receiving the end of sleeve 11 and secured thereto. The ring 23 has matching bolt holes therein to receive bolts securing it to and adjacent gas main flange. In this manner the valve is mounted in and supported by the gas main, which is suitably braced for this purpose.

As previously stated, goggle plate 15 is pivotally mounted upon pin 7. As shown in FIG. 1 the plate 15 is in valve open position. As shown in FIG. 3, plate 15 is in closed position. As shown in FIG. 1, plate 15 has an arcuate outer edge defined by an angle shaped member 24, one leg 24b of which is secured to plate 15 and the other leg 24a extends upwardly therefrom for engagement with a plurality of tracking rollers 25. Leg 24a has a plurality of equally spaced rectangular apertures 26 extending the length thereof. A drive sprocket 27 secured to a shaft 28 engages in said apertures 26 of angle 24 to move the goggle valve from closed to open position and in a reverse direction. Shaft 28 has one end pivotally supported in a bearing 29 and the opposite end forming the slow speed shaft of a suitable speed reducer 30. Said bearing and speed reducer being mounted upon a suitable support comprised of plate 31 secured to valve body plates 5 and 6 by brackets 32. The speed reducer is actuated by a suitable hand wheel 33 which may be driven by a suitable hand chain 34. As shown in FIG. 1, the upper edge of goggle plate 15, has a counterweight 35 secured thereto.

Adjacent rod 7, the goggle plate 15 has an arcuate slotted opening 36 therein through which extends a plate 37. One end of plate 37 is secured to clamping frame 3 by bracket 38 and the opposite end has a goggle plate positioning roller 39 secured thereto by bolt 40. As shown in FIGS. 1 and 3, the goggle plate 15 is provided with two sealing inserts 41 and 42. Insert 41, as shown in FIG. 1, has an opening 43 therein providing for flow of hot gases through the valve body, and insert 42, as shown in FIG. 3, has a closed central portion 44 preventing gas flow through the valve. These inserts are replaceable in the field by burning off the weld connections at 45 upon the outer periphery of the insert and rewelding a new insert in place. It will be noted, in FIG. 1, the insert 41 is exposed at the right side of the valve body when the valve is closed and correspondingly the insert 42 will be exposed at the left side of the valve body when the valve is opened. Inserts 41 and 42 on opposite faces thereof are provided with recesses receiving sealing material, 41a and 42a which are penetrated by the pointed ends of sleeves 10 and 11 of the clamping and stationary frames 2 and 3 when goggle valve plate is clamped in either open or closed positions.

The clamping frame 3 is moved to its "clamped" and "unclamped" positions by frame clamping jacks 46 as in FIGS. 1 and 4. Referring to FIG. 4, each jack 46 is comprised of four plate members 47 pivotally connected in pairs upon opposite sides of the heads 48 of bolts 49 by common pivot pins 50. The free ends of the members 47 are pivotally connected to pivots 51 upon opposite faces of internally threaded sleeve nuts 52 mounted in spaced relation upon threaded stem 53 having jaws 54 at opposite ends thereof. The relation between the threads of stem 53 and nuts 52 is such that rotation of the stem in one direction causes the nuts 52 to approach each other and rotation of the stem in the opposite direction causes the nuts 52 to move in opposite directions away from each other. The expansion and contraction of the clamping jacks 46 upon alternate rotation of the stem 53 reciprocates the clamping frame 3 towards and away from goggle plate 15 and its inserts 41 or 42. As is apparent from FIG. 3, movement of the clamping frame 3 towards the goggle plate 15 advances the pointed end of sleeve 10 into engagement with the sealing material of the goggle plate inserts 41 or 42 and upon continued advancement of frame 3 moves goggle plate 15 upon rod 7 into engagement with the pointed end of stationary frame sleeve portion 11a. Upon retraction of clamping frame 3 towards the left in FIG. 3, the sleeve 10 first moves away from the goggle plates and thereafter roller 39 engages the goggle plate 15 and moves it upon rod 7 free of stationary frame sleeve 11 permitting subsequent free rotation of the goggle valve plate 15.

There are three of the clamping jack assemblies 46 spaced about the valve opening, one adjacent each valve rod 7, 7a and 7b as shown in FIG. 1. To provide uniform movement of the clamping frame by each of said jacks, adjusting washers 54a are provided on each bolt 49 at the connection to the end frame plate 5. The three jacks 46 are connected by means of rigid shafting members 55 having suitably shaped end portions 56 providing universal joint connections therebetween and to the jaws 54 of screw jack stems 53. To maintain the shafting members in operating position, certain of the members 55 are mounted in bearing members 57 secured to suitable brackets such as 58 secured to the adjacent valve plate 5. Rotation of shafting members 55 is obtained through attachment at one end to a reduction gear drive 59 mounted on plate 5 and driven by a suitable chain actuated hand wheel 60. Preferably each jack 46 is provided with a metal telescoping shield (not shown) for protection of the screw therein from dust.

The valve of the invention is preferably shipped assembled for mounting in a horizontal gas main and supported wholly thereby. As shown and described herein it is manually operated. It will be obvious to those skilled in the art that the valve may be motor operated if desired.

The valve by reason of its generally triangular shape having fixed outer plates connected at the apexes of the plates by the fixed rods, upon which are mounted the slidable clamping frame and pivoting goggle plate, provides sufficient column strength therein to make unnecessary additional support from the ground. Thus the valve, when mounted in the gas main, may be treated as a section of the gas main.

The goggle plate centering device, as herein described, prevents dragging of the goggle plate gate across the valve surfaces during plate movement. The clamping mechanism clamps the gate in both open and closed positions. Frequent adjustments, compensating for temperature changes, are not necessary since the gate and clamping section move freely relative to each other and are moved into positive sealing positions after each movement of the gate. Likewise, due to exposure of the unused gate inserts at opposite sides of the valve body, as the gate reciprocates from closed to open and closed position, the valve need not be removed from the line for replacement of such inserts.

Assuming the valve body is mounted in the gas main and the goggle plate 15 is clamped in closed position, as shown in FIGS. 1 and 3, and it is desired to move the plate 15 to open position, the first operation is to unclamp the plate 15 and free it from engagement with sleeves 10 and 11. The clamping hand wheel 60 is first rotated in a suitable direction collapsing the clamping jacks 46 to withdraw clamping frame 3 to the left, as viewed in FIG. 3. Initial movement of frame 3 withdraws sleeve section 10 from engagement with the plate inserts 42 as the frame 3 moves freely upon the rods 7, 7a and 7b. Further movement of the frame 3, causes roller 39 at the right side of the goggle plate 15 to engage the plate and move it to the left out of engagement with the adjacent edge 11a of the sleeve 11. The gate freely moves upon rods 7, 7a and 7b for this purpose. To accommodate this movement of the plates 5, the openings 26 in angle 24 upon the valve gate 15 are laterally elongated. The goggle plate drive hand wheel 33 is then suitably manipulated to rotate drive sprocket 27 to lower plate 15. The counterweight 35, upon upper edge of plate 15 (FIG. 1) is positioned relative to the rod 7 to locate the center of the gravity at the center of the plate. Thus the lowering plate 15, as actuated by the driving sprocket 27 moves smoothly upon the rollers 25 (FIGS. 1 and 5) until the plate 15 aperture 43 is aligned with the gas main inner diameter whereupon the plate 15 engages a suitable stop arresting further movement. The clamping hand wheel 60 is then rotated in the opposite direction to move clamping frame 3 sleeve sections 10 into engagement with the gate insert 41 and to further move the clamping frame 3 and gate 15 into engagement with sleeve 11 to seal the gate by penetration of the pointed adjacent ends 10a and 11a of sleeves 10 and 11 into the sealing material 41a.

From the preceding description it will be noted that there are three jacks 46 equally spaced about the periphery of the gate opening and the valve gate is smoothly moved upon the rod 7, along with the clamping frame 3. When the valve plate is in "open" position, the valve plate portion containing the gas main closing insert 44 is disposed to the left of the valve body, as viewed in FIG. 1.

When it is desired to "close off" the gas main, the clamping frame 3 is unlocked, drawing the valve gate 15 free of sleeve portion 11, and the goggle plate drive handwheel 33 is suitably rotated to swing the valve plate 15 to the right, as viewed in FIG. 1, until the left side of the valve gate 15 engages a suitable stop when the insert 44 is positioned to "close off" the gas main. Thereafter the clamping frame 3 is moved by handwheel 60 to clamp the insert 41a between the sleeves 10a and 11a.

The valve when constructed and operated, as herein described, assures an absolute separation in the gas main to prevent leakage of gas from one side of the valve to the other. If for some reason such as improper clamping, a leakage should occur between the valve plate and the seating member, this leakage would be admitted to the atmosphere along plate 15 and between the clamping frame and the stationary frame and not around the plate to the depressurized side of the valve.

Although a manual operating device has been shown and described, it will be understood that suitable motor operation may be provided through use of existing devices well known in the art.

I claim:
1. In a goggle valve construction for mounting as a unit in a gas main to be controlled thereby, in combination,
 a pair of spaced end plates connected in fixed spaced relation by a plurality of rod members spaced about the peripheries of said end plates,
 a clamping plate disposed between and in spaced relation to both said end plates and slidably mounted upon said rod members,
 a goggle valve plate disposed between said clamping plate and one of said end plates and pivotally and slidably mounted at one end upon one of said rod members,
 axially aligned spaced sleeve members mounted in fixed relation within aligned apertures in said end and clamping plates with the outer ends of each said end plate sleeve members shaped for attachment to said gas main,
 a plurality of spaced expansible and contractable clamping jacks mounted upon one of said end plates and connected to the adjacent clamping plate,
 means connecting said clamping jacks for actuation thereof into expanded and contracted positions for moving the clamping plate away from and towards its associated end plate and into and out of clamping engagement with said goggle valve plate,
 a pair of spaced radially aligned annular inserts in said goggle valve plate for selective positioning for engagement with adjacent annular ends of the sleeve members of the adjacent clamping and end plates when the valve plate is selectively clamped in valve open and valve closed positions,
 one said goggle valve annular inserts being provided with a closure member blocking passage of gas through said associated valve end and clamping plate sleeves when the goggle valve plate is positioned in valve closed position, and,
 means associated with said goggle valve plate for selectively moving the latter into valve open and valve closed clamping position.

2. The goggle valve construction as defined in claim 1, wherein
 said valve plate annular inserts on opposite faces thereof are provided with annular recesses which are filled with sealing material for engagement by the adjacent ends of the clamping and end plate sleeves,
 a member is mounted on said clamping plate and extends therefrom through an arcuate opening in said adjacent valve plate above said annular inserts, and
 an abutment member secured to said clamping plate member limits relative movement between the clamping and valve plates during contraction of the clamping jacks after moving the clamping plate sleeve out of sealing engagement with the goggle plate insert sealing material.

3. The valve construction as defined in claim 2, wherein the mounting of each clamping jack upon the valve end plate includes an adjustment means for securing effective sealing of the end plate sleeve with the goggle valve annular insert sealing material during expansion of said clamping jacks.

References Cited by the Examiner
UNITED STATES PATENTS

| | | | |
|---|---|---|---|
| 1,727,628 | 9/29 | Baker | 138—94.3 |
| 2,299,124 | 10/42 | Boynton et al. | 138—94.3 |
| 2,661,771 | 12/53 | Hookham | 138—94.5 |
| 2,781,787 | 2/57 | Johnson | 138—94.5 |

LEWIS J. LENNY, *Primary Examiner.*

EDWARD V. BENHAM, *Examiner.*